(12) United States Patent
Hossain et al.

(10) Patent No.: US 7,902,520 B2
(45) Date of Patent: Mar. 8, 2011

(54) RADIATION DETECTING ELECTRONIC DEVICE AND METHODS OF OPERATING

(75) Inventors: Timothy Z. Hossain, Austin, TX (US); Patrick Mark Clopton, Austin, TX (US); Clayton Fullwood, Austin, TX (US); Dan E. Posey, Granite Shoals, TX (US)

(73) Assignee: Spansion LLC, Sunnyvale, CA (US)

( * ) Notice: Subject to any disclaimer, the term of this patent is extended or adjusted under 35 U.S.C. 154(b) by 97 days.

(21) Appl. No.: 12/340,288

(22) Filed: Dec. 19, 2008

(65) Prior Publication Data

US 2010/0155618 A1 Jun. 24, 2010

Related U.S. Application Data

(60) Provisional application No. 61/060,001, filed on Jun. 9, 2008.

(51) Int. Cl.
*G01T 1/00* (2006.01)
(52) U.S. Cl. .......................................... 250/395

(58) Field of Classification Search ............. 250/370.05, 250/395, 370.01, 390.01, 391
See application file for complete search history.

(56) References Cited

U.S. PATENT DOCUMENTS

| | | | |
|---|---|---|---|
| 5,444,254 A * | 8/1995 | Thomson | 250/370.07 |
| 7,148,484 B2 | 12/2006 | Craig et al. | |
| 7,183,550 B2 * | 2/2007 | Arques | 250/336.1 |
| 7,271,389 B2 | 9/2007 | August et al. | |
| 7,652,261 B1 * | 1/2010 | Wilson et al. | 250/370.11 |
| 2006/0169905 A1 * | 8/2006 | Wenstrand | 250/370.1 |

* cited by examiner

*Primary Examiner* — David P Porta
*Assistant Examiner* — Marcus H Taningco

(57) ABSTRACT

A method of operating an electronic device including determining an initial charge level at a non-volatile charge storage structure of a radiation-sensitive device including a radiation-reactive material and determining if a first radiation event has occurred based upon the non-volatile charge storage device having a different charge level than the initial charge level. The method further includes identifying the first radiation event as associated with either a first type of radiation or a second type of radiation based upon the different charge level.

19 Claims, 2 Drawing Sheets

US 7,902,520 B2

RADIATION DETECTING ELECTRONIC DEVICE AND METHODS OF OPERATING

CROSS-REFERENCE TO RELATED APPLICATION(S)

The following disclosure is a non-provisional application which claims priority to U.S. Provisional Application No. 61/060,001 filed Jun. 9, 2008, entitled "Imaging Device" and having named inventor Timothy Z. Hossain, which application is incorporated by reference herein in its entirety.

BACKGROUND

1. Field of the Disclosure

The following application is directed to radiation-detecting devices, and more particularly radiation-detecting devices incorporating charge storage structures.

2. Description of the Related Art

Radiation-detecting devices can be used to detect certain types of radiation, however, some may be particularly expensive and cumbersome. For example, conventional neutron detectors generally include a container including a neutron sensitive gas, such as $^3$He or $BF_3$, and an electrically charged wire having leads which extend outside of the container. In operation, incident neutrons react with the gas to produce charged particles which change the electrical potential of the wire. A measurement system coupled to the charged wire measures the electrical pulses and uses this information to indicate the presence of neutrons. These types of neutrons detectors are undesirably bulky and are associated with poor sensitivity resulting from, for example, electronic noise.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is directed to an electronic device capable of detecting radiation. Certain types of radiation particularly suitable for detection by the device include ionizing radiation, such as gamma rays, x-rays, beta particles, alpha particles, and neutrons. Additionally, the following is directed to methods of operating such devices, including for example, methods of modifying charges at charge storage devices suitable for detecting radiation, and particularly modifying the charge at the charge storage devices based upon a type of radiation to be detected.

Figure 1:
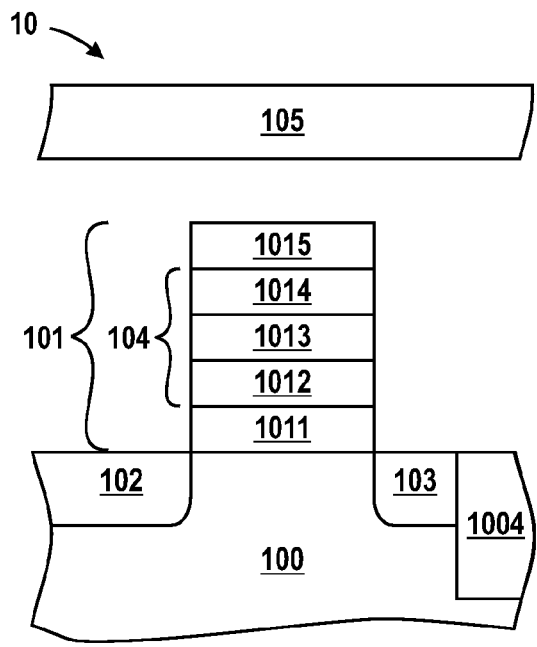
FIG. 1 includes a cross-sectional illustration of a portion of a radiation-detecting device including a radiation-detecting structure in accordance with an embodiment.

FIG. 1 includes a cross-sectional illustration of a portion of a radiation-detecting device 10 that includes a radiation-detecting structure that can be used in accordance with an embodiment to detect radiation. As illustrated, the radiation detecting device 10 includes a substrate 100, generally suitable for supporting components. The substrate 100 can include a semiconductor material or insulative material, or any combination thereof. For example, the workpiece can include a monocrystalline semiconductor wafer, semiconductor-on-insulator (SOI) wafer, a flat panel display (e.g., a silicon layer over a glass plate), or other substrates conventionally used to form electronic devices. In accordance with a particular embodiment, the substrate 100 is made of a single crystal material, such as a single crystal silicon wafer. Furthermore, the substrate 100 can include a dopant, such as including a n-type or p-type dopant. Substrate 100 can include electronic components or portions of electronic components previously formed thereon, including for example, implant regions, field isolation regions, or other layers used to form electronic components.

According to one embodiment, the substrate 100 can include a semiconductor material. Some suitable semiconductor materials can include elements selected from Groups 13, 14, and 15 of the Periodic Table according to the new IUPAC format. For example, certain semiconductive materials can include silicon, germanium, arsenic, gallium, indium, carbon, a combination thereof, and the like.

As further illustrated in FIG. 1, the device 10 includes a stack 101 made of a plurality of layers overlying the substrate 100. The stack 101 represents a structure suitable for storing charges, for example, it may be a transistor gate stack having a charge storage structure. As illustrated, the stack 101 includes a layer 1011 disposed directly overlying and abutting an upper surface of the substrate 100. In accordance with a particular embodiment, layer 1011 includes a dielectric material. Suitable dielectric materials can include oxides, nitrides, and combinations thereof. In accordance with a particular embodiment, the layer 1011 includes silicon dioxide. Layer 1011 can be formed by growth techniques, deposition techniques, and the like.

As further illustrated in FIG. 1, the stack 101 includes a charge storage structure 104 overlying the substrate 100. Notably, the charge storage structure 104 includes a plurality of layers, particularly layers 1012, 1013, and 1014. It will be appreciated that the charge storage structure 104 facilitates the storage of charge therein, and thereby facilitates storage of data. Additionally, as illustrated in this particular embodiment, layers 1012, 1013, and 1014 are in direct contact with each other (i.e., abutting).

The charge storage structure 104 includes layer 1012 overlying and abutting layer 1011. In accordance with an embodiment, layer 1012 can include a dielectric material, such as those described in accordance with layer 1011. For example, layer 1012 can include silicon dioxide. Layer 1012 and layer 1011 can be distinct and separately formed layers, such as a native oxide layer 1011 and a thermally grown oxide layer 1012. Alternatively, it will be appreciated that layers 1012 and 1011 can be different regions of a commonly formed layer. Layer 1012 can be formed by growth techniques, deposition techniques, and the like.

The charge storage structure 104 further includes a layer 1013 overlying and abutting layer 1012. In accordance with an embodiment, layer 1013 includes a conductive material, such as a metal. According to an alternative embodiment, layer 1013 includes a non-conductive material, such as a nitride material. Other features of layer 1013 will be discussed in more detail herein. Layer 1013 can be formed by growth techniques, deposition techniques, and the like The charge storage structure 104 further includes layer 1014 overlying and abutting layer 1013. The layer 1014 can include a dielectric material such as those discussed in accordance with layer 1012. Layer 1014 can be formed by growth techniques, deposition techniques, and the like.

As further illustrated in FIG. 1, the device 10 includes a layer 1015 overlying the charge storage structure 104. Layer 1015 can include a semiconductive material, a metal, and the like. Suitable semiconductive materials can include silicon, germanium, gallium, or a combination thereof. In accordance with one particular embodiment, the layer 1015 includes a doped polysilicon.

The device 10 of FIG. 1 further includes a layer 105 overlying the charge storage structure 104 and the substrate 100. In accordance with a particular embodiment, the layer 105 is a radiation-reactive upper layer. As used herein, the term "radiation-reactive" refers to a layer or material having a high probability of interacting with radiation to generate or spawn a charged particle or photon. For example, one such radiation-reactive material is a material that includes boron-10 ($^{10}$B), which is an element having a high probability of interacting with radiated neutrons and spawning an alpha particle and a lithium-7 ($^{7}$Li) particle upon interacting with a neutron. In contrast, other forms of boron, such as boron-11 ($^{11}$B), are not radiation-reactive, as such elements do not have a tendency to interact with radiated neutrons. Accordingly, materials or layers that include a radiation-reactive material can include radiation-reactive elements such as boron-10 ($^{10}$B), lithium-6 ($^{6}$Li), cadmium-113 ($^{113}$Cd), and gadolinium-157 ($^{157}$Gd), or a combination thereof. Additionally, layers including radiation-reactive materials may be in the form of compounds, for example inorganic compounds, such as carbides, nitrides, borides, oxides, silicides, oxynitrides, and a combination thereof. According to one embodiment, layer 105 includes a boron-10 compound such as boron nitride or boron carbide. In an alternative embodiment, layer 105 includes lithium nitride including lithium-6 atoms. In certain embodiments, the radiation-reactive material can be included in an amorphous material. For example, the radiation-reactive material can be incorporated in a glass material. In one particular embodiment, the radiation-reactive material includes borophosphosilicate glass material.

In accordance with an embodiment, layer 105 is a radiation-reactive layer including a radiation-reactive material. For example, according to a particular embodiment, layer 105 includes boron. In accordance with more particular embodiments, layer 105 can include a certain percentage of boron, such that at least about 5% of the boron atoms within the layer are boron-10 atoms. Still, in other embodiments the total percentage of boron-10 atoms of all boron atoms within layer 105 can be greater, such as at least about 10%, at least about 25%, or at least about 50%. Still, particular embodiments may contain a percentage of boron-10 atoms that is not greater than about 80% of the total boron atoms present within layer 105, such as about 75%, 65%, or 60% based upon the sensitivity of the device and the intended application. Notably, other instances may have a percentage of boron-10 atoms within layer 105 that is greater than about 80% of the total boron atoms present within layer 105.

Layer 105 can have an average thickness that is at least about 3 microns, particularly in those application using boron-10. In other embodiments, the average thickness of layer 105 can be greater, such as at least about 5 microns, at least about 8 microns, 10 microns, 15 microns or even at least about 20 microns. In accordance with a particular embodiment, the average thickness of layer 105 is within a range between about 3 microns and about 20 microns, and even more particularly between about 5 microns and about 15 microns.

Notably, certain materials may be more suitable for use with thicker layers, for example lithium, (i.e., lithium-6), which may be more useful in layers having thicknesses exceeding 10 microns, such as at least about 15 microns, 20 microns. In certain embodiments, the thickness of certain lithium-6 containing layers is within a range between about 10 microns and about 30 microns.

Referring again to the charge storage structure 104, as described previously, layer 1013 can include a charge storage material such as silicon nitride. Still, in other particular embodiments, the layer 1013 can include a radiation-reactive material such as that described in accordance with layer 105. For example, according to an embodiment, a material of layer 1013 includes boron, for example boron nitride, where a concentration of the boron is boron-10. As discussed above in accordance with layer 105, layer 1013 can include certain concentrations of boron-10 atoms as identified above.

While reference to the charge storage structure 104 has been made, wherein layer 1013 can be made of a non-conductive material, such as silicon nitride, it will be appreciated, in other embodiments the charge storage structure 104 can incorporate a conductive layer. For example, the charge storage structure can include an isolated conductive layer, such as a metal-containing layer. Moreover, while the embodiment of FIG. 2 has illustrated a charge storage structure 104 as part of a transistor stack, it will be appreciated that in other embodiments charge storage structures need not be incorporated as part of a transistor stack.

As such, the average thickness of the layer 1013 can be within a range between about 1 nm and about 500 nm, such as within a range between about 2 nm and about 250 nm, or even more particularly within a range between about 10 nm and about 100 nm.

FIG. 1 further illustrates regions 102 and 103 within the substrate 100 and underlying portions of the stack 101. In accordance with a particular embodiment, regions 102 and 103 can be implant regions within the substrate 100 suitable for allowing flow of electrons through a transistor that is associated with the stack 101. In accordance with a particular embodiment, regions 102 and 103 can be doped source/drain regions, including a n-type or p-type dopant material. In more particular instances, regions 102 and 103 can include a radiation-reactive material. For example, in accordance with on embodiment, the regions 102 and 103 include boron-10. The region directly underlying the stack 101 is a channel region that can be doped to have the opposite conductivity-type as the source drain regions.

As will be appreciated, the referenced radiation-detecting structure of the device 10 can include the substrate 100, the source/drain regions 102 and 103 and channel region within the substrate 100, the stack 101, and layer 105 as described above. As used throughout the subsequent description, a radiation-detecting structure will be generally be understood to incorporate similar elements unless otherwise stated. It will be appreciated that other elements may be considered part of the radiation-detecting structure, for example, other regions, structures, and components that are used to detect the occurrence of a radiation event.

FIG. 1 further illustrates region 1004 within the substrate 100 adjacent to, and in particular, abutting region 103. In one particular instance, region 1004 can be a field isolation region suitable for electrically insulating the source drain region 103 from other adjacent source/drain regions, for example separation of multiple transistors disposed at the substrate 100. In accordance with one embodiment, the region 1004 can include a radiation-reactive material. For example, in certain embodiments, the region 1004 can include a dielectric compound including the radiation-reactive material such as boron nitride, boron carbide, or lithium nitride.

Figure 2:
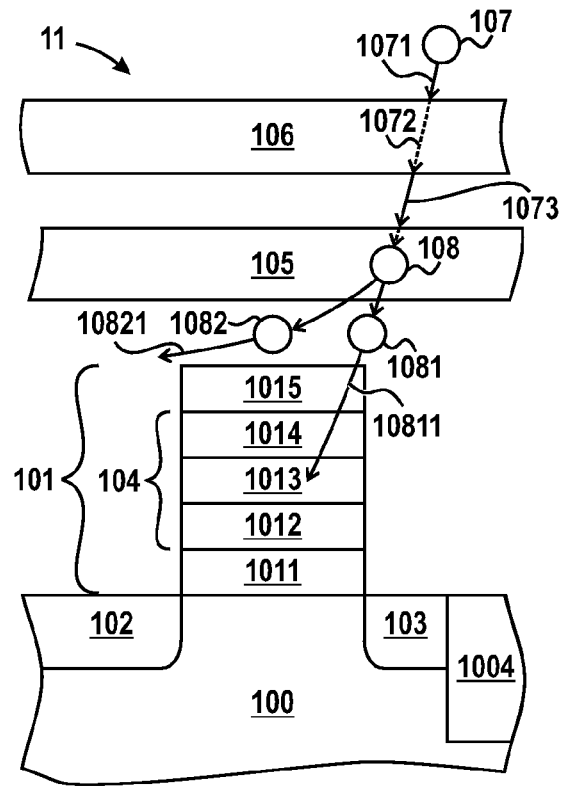
FIG. 2 includes a cross-sectional illustration of a portion of a radiation-detecting device including a radiation-detecting structure in accordance with an embodiment.

FIG. 2 includes a cross-sectional illustration of a portion of a radiation detecting device 11 including a radiation-detecting structure in accordance with an embodiment. The device 11 includes a radiation-detecting structure similar to that described at FIG. 1 with the addition of layer 106 overlying layer 105. In particular, the radiation-detecting structure includes the elements previously identified and the layer 106.

As further illustrated in FIG. 2, the radiation-detecting structure of device 11 includes a layer 106 overlying layer 105 that represents a thermalizing material. As used herein, reference to a "thermalizing material" is reference to a material capable of slowing down a particular type of radiation, thus making it more apt to be detected by the radiation-detecting structure. For example, with respect to neutron radiation, suitable thermalizing materials can include hydrogen-containing materials, deuterium-containing material, and carbon-containing materials. In some instances, such thermalizing materials may be combined with other materials such as metals, ceramics, polymers, or combinations thereof. For example, the thermalizing material can be a polymer material such as polyolefins, polyamids, polyimids, polyesters, polystyrenes, polycarbonates, polyurethanes, polyethers, polysulphones, polyvinyls, and polyactic acids, or combinations thereof.

In particular embodiments, layer 106 can be a polymer containing a minimum amount of a deuterium-containing material, such as at least about 1 wt % deuterium. Other embodiments, may contain a greater content of the deuterium-containing material assuring suitable reduced speeds for the incoming radiation. As such, the polymer can contain at least 10 wt % deuterium, or even at least about 15 wt % deuterium. Still, particular embodiments utilizing a minority amount of the deuterium-containing material such that it is within a range between about 1 wt % and about 30 wt %.

FIG. 2 further illustrates a thermalizing event with respect to a particle 107. In accordance with a particular embodiment, particle 107 can include a neutron particle traveling on a path 1071 towards layer 106. Upon striking and interacting with layer 106, the neutron particle 107 is slowed, i.e., thermalized, and has a path 1072 through the layer 106 containing the thermalizing material. Upon slowing of the neutron particle 107, it exits layer 106 and travels along path 1073 towards the layer 105, which according to embodiments herein, contains a radiation-reactive material. Upon striking the layer 105 containing the radiation-reactive material, such as boron-10, the particle 107, e.g., a neutron, reacts with the boron-10 atom 108 and the resulting reaction generates two particles 1082 and 1081 that exit the layer 105 upon paths 10821 and 10811.

In particular reference to neutron particles, during such a reaction with boron-10, the interaction between the neutron particle 107 and boron-10 atom 108 results in the generation of an alpha particle and a lithium-7 particle. The emitted particles 1082 and 1081 that result from the interaction of the neutron particle 107 with the boron-10 atom 108 can cause a modification of the charge stored within charge storage structure 104, which can be detected as a change of a charge storage state. In one embodiment, a charge-detecting device detects a change of the charge storage state as a change in conductive state of a transistor associated with the charge storage structure that has had its charge modified. In particular, it is thought that the generation of a particle/or photon 1081 extending along path 10811, as illustrated in FIG. 3, interacts with the material of the charge storage structure 104 to cause a change of state.

In further reference to FIG. 2, in accordance with a particular embodiment, the layer 106 includes a thermalizing material as described herein. In certain other embodiments, other layers within the radiation-detecting structure 11 can include thermalizing materials. For instance, a portion of the charge storage structure 104 can include a thermalizing material. Suitable layers within the charge storage structure containing the thermalizing material can include dielectric layers, such as 1014 and 1012. In accordance with one particular embodiment, the dielectric layers 1014 and 1012 may be particularly suited to include a thermalizing material such as deuterium. For example, formation of such layers may be carried out such that the reactants (e.g., Silane™) include the thermalizing material such as deuterium, such that when the layers 1012 and 1014 are formed, they naturally include the thermalizing material.

Figure 3:
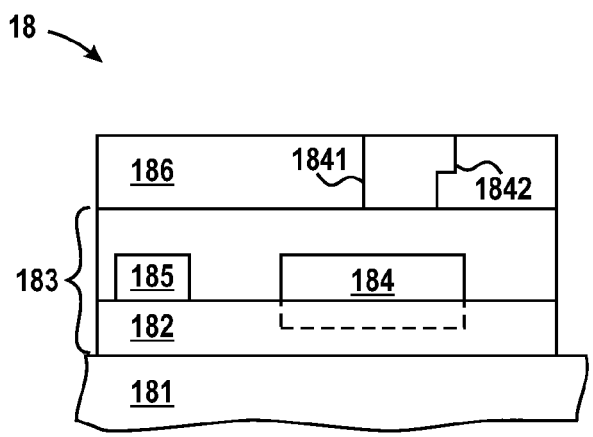
FIG. 3 includes a cross-sectional illustration of a portion of a radiation-detecting device including a radiation-detecting structure in accordance with an embodiment.

FIG. 3 includes a cross-sectional illustration of a portion of a radiation detecting device 18 including a radiation-detecting structure in accordance with an embodiment. In particular, FIG. 3 illustrates a radiation-detecting device 18 that includes a base 181, a substrate 182 overlying the base 181, where the substrate 182 is part of an integrated circuit device 183. The integrated circuit 183 further includes a logic circuit 185 electrically coupled to the radiation-detecting structure 184. A cover 186 overlies the radiation-detecting structure 184.

The base 181 provides a rigid support suitable for the integrated circuit 183, and particularly the substrate 182. As such, the base 181 can include a metal, polymer, or ceramic material. In accordance with one embodiment, the base 181 includes a ceramic material such as an oxide, carbide, nitride, boride, or a combination thereof. In accordance with another embodiment, the base 181 can include a radiation-absorbing material, more particularly a neutron-absorbing material. As such, suitable neutron-absorbing materials can include metals, such as cadmium or gadolinium.

The base 181 can further be configured such that it has a size that is greater than that of the substrate 182. For example, the base 181 can have a diameter and thickness greater than that of the substrate 182 and the integrated circuit 183. Additionally, while not illustrated in the embodiment of FIG. 3, the base 181 can be shaped such that it covers and can be in direct contact with a majority of the external surface area of the substrate 182. For example, in one certain embodiment the base 181 wraps around the sides of the substrate 182. In another particular embodiment, the substrate 182 can be disposed within an interior space within the base 181, such that the substrate 182 is recessed within an opening in the base 181.

The substrate 182 can provide a support suitable for formation of the radiation-detecting structure 184 thereon. In accordance with an embodiment, the substrate can include a semiconductor material as described herein. For example, in certain instances, substrate can include a single crystal material, such that in certain instances the substrate 182 can be an entire single crystal wafer used in processing microelectronic devices, or a portion of an entire single crystal layer. In one particular embodiment, the substrate 182 is a semiconductor-on-insulator material, or bulk semiconductor material. According to an alternative embodiment, the substrate 182 can include an amorphous material, such that it can be a glass, and more particularly a glass panel, such as used in the LCD display industry.

Generally, the substrate 182 has a size sufficient to hold the structures thereon. As such, according to one embodiment, the substrate 182 can have a diameter of at least about 10 cm. In other embodiments, the substrate 182 has a greater diameter, such as at least about 15 cm, at least about 20 cm, and more particularly within a range between about 10 cm and about 60 cm.

In further reference to the geometry of the substrate 182, generally the substrate 182 has a thickness such that it is sufficiently rigid and strong to be mounted on the base 181 and support the radiation-detecting structure 184. As such, in one embodiment, the substrate has an average thickness of at least about 0.5 mm. In other embodiments, the substrate has a thickness that is on the order of at least about 0.75 mm, at least about 1 mm, at least about 3 mm, and particularly within a range between about 0.5 mm and about 5 mm, such that in certain particular embodiments the substrate can be an unpolished wafer.

The radiation-detecting structure 184 is disposed at the substrate 182. In particular, the radiation-detecting structure 184 can include a memory array and having an array of charge storage structures. Notably, the radiation-detecting structure 184 can include features previously described and illustrated in FIGS. 1-2. In particular, the radiation-detecting structure 184 can include an array of charge storage structures, wherein each of the charge storage structures can include those components illustrated in FIG. 1. In accordance with a particular embodiment, the device 18 can include an array of charge storage structures such as not less than about 100 charge storage structures. Other embodiments may utilize more, such as not less than about 200, not less than 300, or even not less than 500 charge storage structures.

In certain embodiments, the electronic device 18 may have a housing that holds more than one radiation-detecting structure 184. In fact, the housing can include a chip (i.e., semiconductor die) wherein each semiconductor die contains at least one array of radiation-detecting structures in the form of charge storage structures. In such embodiments, the housing can include more than one semiconductor die to increase the sensitivity of the device and improve the opacity of the electronic components to certain types of radiation. According to one embodiment, such electronic components can include at least about 3 semiconductor dice, or at least about 5 semiconductor dice, or even at least about 6 semiconductor dice within the housing. Generally, the number of semiconductor dice within an electronic components is not greater than about 12, and more particularly, within a range between 5 and 8 semiconductor dice (each semiconductor die containing a single memory array of radiation-detecting structures).

The radiation detecting device can include additional components, such as a logic circuit 185 electrically coupled to the radiation-detecting structure 184 such that it is capable of controlling the charge storage structures and performing certain operations, such as various operations associated with detecting the occurrence of a radiation event. It will be appreciated that the combination of the substrate 182, radiation-detecting structure 184, and logic circuit 185 can be part of the integrated circuit 183 overlying the base 181. Similarly, other electrical components (e.g., capacitors, diodes, etc.) not currently illustrated may be included in the device 18, and more particularly disposed at the substrate 182 for interaction with the logic circuit 185 and radiation-detecting structure 184.

The device 18 further includes a cover 186 overlying the radiation-detecting structure 184, and more particularly overlying the upper surface of the integrated circuit 183. The cover can provide protection from environmental factors, such as dust and the like that may damage the components of the integrated circuit 183. In accordance with a particular embodiment, the cover 186 can be a flexible material, and may include a polymer. In certain embodiments, the cover 186 may be mechanically coupled to a portion of the base 181. Still, in other embodiments, the cover 186 may be mechanically coupled to portions of the substrate 182.

In fact, according to one particular embodiment, the cover 186 can be a flexible circuit, having conductive busses and electrodes disposed therein for electrical connection to the integrated circuit 183. That is, according to one embodiment, the cover 186 can be an interposer capable of providing electrical connections between an upper surface of the integrated circuit 183 and external contact of the interposer. For example, cover 186 can include electrical connections or interconnects 1841 and 1842 extending from an upper surface of the cover 186 to an upper surface of the integrated circuit 183 for electrical connection to components within the integrated circuit 183, such as the radiation-detecting structure 184.

Figure 4:
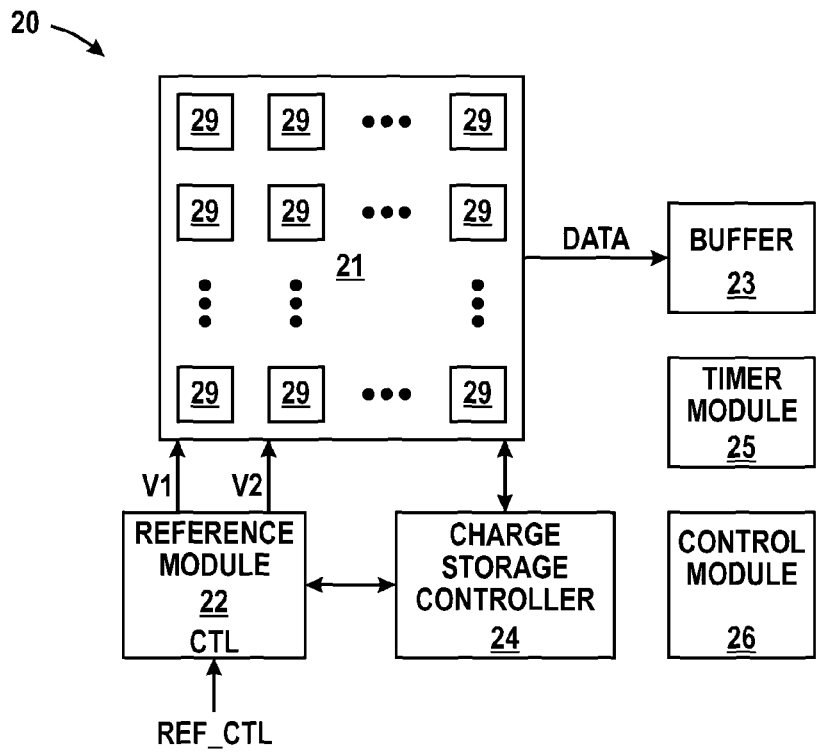
FIG. 4 includes a schematic block diagram of a portion of a radiation-detecting device including a radiation-detecting structure including an array of charge storage structures in accordance with an embodiment.

FIG. 4 illustrates a portion of a radiation detecting device 20 that detects radiation. Specifically, the radiation-detecting device 20 includes a radiation-detecting structure 21 including an array of charge storage structures 29, a reference module 22, a buffer 23, charge storage controller 24 (i.e., a digital signal processor), a timer module 25, and a control module 26. It will be appreciated that each of the charge storage structures 29 can be integrated as part of a radiation-detecting structure, which can be associated with a transistor device, or other electronic device.

Notably, the radiation-detecting structure 21 can be a memory array including as illustrated an array of charge storage structures. For instance, the memory array can be a non-volatile memory array. It will be appreciated, that a non-volatile memory is a device that maintains a programmed state in the absence of a radiation event when there is no power to the device.

The device 20 represents an integrated circuit device, whereby the elements illustrated are integrated at a common substrate, such as a semiconductor substrate. Reference module 22 can provide a voltage reference signal to the array of charge storage structures 29, and more particularly can be a controllable digital signal reference module 22 that can provide voltage references based upon a signal REF_CTL. The device 20 further includes a control module 26 that can be used to control various portions of device 20, including a voltage provided by the reference module 22, and determine a state of each of the charge storage structures 29. In one embodiment, the control module 26 provides control signals to the reference module 22 to determine whether or not a transistor associated with a specific storage structure 29 is in a conductive or non-conductive state for a specific read voltage, provided by reference module 22, applied at its control gate. By determining whether any one of the charge storage structures 29 is in a different state than expected, the occurrence of a radiation event can be detected.

The timer module 25 can be used to control when periodic accesses to the radiation detection structure are made. For example, during a detection mode of operation, the timer module 25 would maintain a count, e.g., a time, to determine when to read information stored at the charge storage structures 29 used to determine if a radiation event has occurred. When the storage structures 29 are non-volatile devices, power does not need to be applied to the radiation-detecting structure 21 prior to the timer module 25 indicating information at the charge storage structures 29 is to be read, because the charge storage structures 29 do not need to be powered to have their charges modified by a radiation event. Instead, the array of charge storage structures 29, and its associated circuitry only needs to be powered when the information at the array of charge storage structures 29 is being accessed, or when a portion of the device, such as the timer module 25, needs to be active.

As further illustrated, the device 20 includes a control module 26 that can operate during a detection operation to determine state information of each of the charge storage structures 29 indicative of their corresponding storage states and load this information into a buffer 23, which can be a memory array, such as an SRAM that can be accessed faster than the radiation detecting structure 21. In other words, control information can be provided from control module 26 to the buffer 23 and to the array of charge storage structures 29 in order to provide state information of the charge storage structures 29 to the buffer 23. Once the state information is stored at buffer 23, the state of each charge of the charge storage structures 29 can be modified to a desired state, such as to its previous state.

Referring briefly to characteristics of certain types of radiation, it will be appreciated that each type of radiation can have a particular signature based on the energy associated therewith, and accordingly the signature associated with the detectable change in the threshold voltage of a transistor associated with a charge storage structure that interacts with the particular type of radiation. For example, the energy associated with certain types of radiation, such as gamma rays and x-rays, is generally narrow in range, and will cause relatively small changes in the threshold voltage at the device, such as between about 200-500 mV and 100-300 mV, respectively. Neutron particles can have a different signature, since particles spawned from neutron interactions with the radiation-reactive material can have a broad range of possible energies upon interacting with the charge storage structures depending upon certain criteria, such as the distance between the charge storage structure and the radiation-reactive material. Thus these particles can cause a greater range of possible shifts in the threshold voltage of the charge storage devices 29. As such, it has been empirically determined that neutrons are capable of causing shifts in a threshold voltage from 400 mV to 2.2 V.

Figure 5:
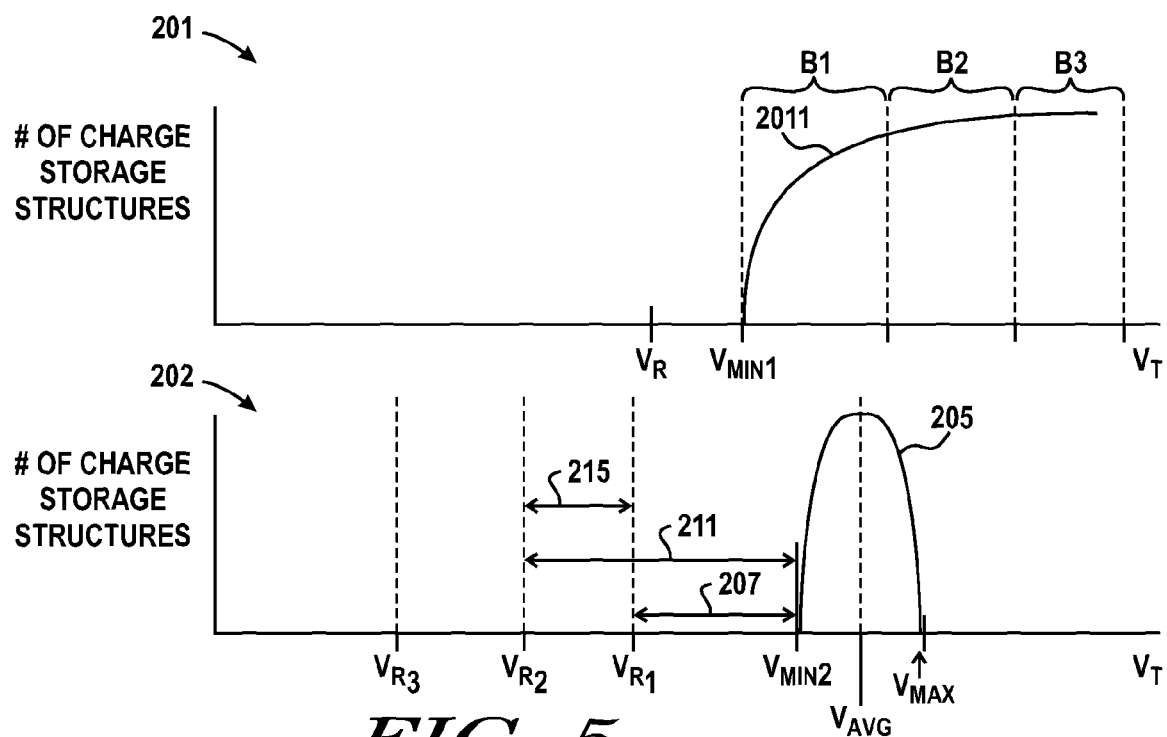
FIG. 5 includes two graphs representing a plurality of charge storage structures as plotted along their y-axes and their associated threshold voltages as plotted along their x-axes.

Referring now to methods of detecting certain types of radiation, and more particularly distinguishing between the types of radiation detected, FIG. 5 illustrates a graph 201 and a graph 202 having curves 2011 and 205, respectively, that represent a number of charge storage structures within the radiation-detecting structure 21 along their y-axes and the threshold voltage associated with each of the corresponding charge storage structures along their x-axes. As previously described, each charge storage structure 29 is incorporated within a transistor that will either be conductive or non-conductive, depending upon a read voltage ($V_R$) applied at its control gate. The voltage $V_R$ represents a read voltage applied to a transistor, such as that associated with charge storage structure 104 of FIG. 1. Graph 201 represents the distribution of voltage thresholds amongst all the members of a charge storage array prior to being exposed to any radiation. For example, after manufacturing, graph 201 can represent a distribution of voltage thresholds for transistors associated with charge storage structures after manufacturing, whereby each transistor has a voltage threshold at or above a minimum voltage $V_{MIN1}$. However, as illustrated at graph 201, the threshold voltages are widely distributed above voltage $V_{MIN1}$.

In order to better detect a radiation event, which is assumed for purposes of illustration to shift the voltage threshold of a transistor to a lower voltage by a deterministic amount, it can be desirable to determine an initial charge level at the charge storage structures 29 of the radiation-detecting device. For purposes herein, the charge storage structures 29 are non-volatile charge storage structures including such devices as capacitors or transistors. Determining the initial charge level can be done in various ways. For example, in some instances, the process can include reading and storing the initial charge stored at each of the transistors. Alternatively, in other embodiments, the process includes setting an amount of charge at each one of the charge storage structures 29 such that its associated transistor will have a desired charge level (i.e., voltage threshold). Such a charge setting process can include setting the charge level of all charge storage structures 29 within a relatively narrow and defined voltage range.

Referring to the process of reading and storing charge values, the process can be initiated by reading the initial charge level of each of the transistors associated with the charge storage structures 29 across the distribution of initial charge levels as represented by the graph 201. In particular, the reading process can include monitoring the conductive state of a device as different read voltages are applied to determine the initial charge level at each of the charge storage structures 29, by determining when the transistor turns from a non-conductive state to a conductive state (or vise versa depending upon the reading process). Upon determining the initial charge level at the charge storage structures 29, the initial charge level associated with each of the charge storage structures 29 can be stored. As will be appreciated, each initial charge level will be stored such that it is addressed to a particular charge storage structure 29.

The initial charge level associated with each of the charge storage structures 29 can be stored at local memory devices, such as those on the same chip or integrated circuit. Alternatively, the information regarding the initial charge level of a charge storage structure 29 may be stored remotely.

Upon reading and storing the initial charge levels for each of the charge storage structures 29, the device can use these values to detect changes and determine radiation events. A radiation event will cause the threshold voltage of one of the transistors associated with the charge storage structures 29 to change by a determinate amount. This change is detected by conducting a read operation, or a series of read operations at different read voltages, to determine the new threshold voltage of the charge storage structure. Like the initial read operation used to determine the initial charge level, the subsequent read operations can be performed until a storage structure's current charge is detected.

Once the new threshold voltage is determined, a comparing process can be conducted. The comparing process includes a comparison between the new threshold voltage and the initial charge level (i.e., initial threshold voltage) of the affected charge storage structure, to determine the change in threshold voltage of the affected charge storage structure 29. The change in threshold voltage can be used to determine the type of radiation detected based upon known signatures of the different types of radiation.

However, the process of reading, storing, reading, and comparing the threshold voltages for each of the charge storage structures 29 can be burdensome. As such, the process of reading and storing the initial charge level of each of the charge storage structures 29 can include a categorization process, such that each of the charge levels associated with each of the charge storage structures 29 within the array of the radiation-detecting structures are categorized into bins. For example, as illustrated in the graph associated with the curve 2011 of FIG. 5, the threshold voltages of each of the charge storage structures 29 can be categorized according to bins B1, B2, and B3 depending upon the initial charge level (i.e., initial threshold voltage) at the transistor associated with each charge storage structure 29.

The binning process allows for categorization of the initial charge level associated with each of the charge storage structures 29. As such, upon detecting a radiation event, all charge storage structures 29 having an initial charge level associated with one of the bins can be read using a single read voltage to determine if any of the charge storage structures 29 have changed states and detected a radiation event. If a change in state of a charge storage structure 29 at a specific bin is detected, additional read operation at different read voltages can be conducted to determine the new threshold voltage of the transistor associated with the affected charge storage structure 29. Upon determining the new threshold voltage, and given the initial charge level of the affected charge storage structure 29 based on its initial bin categorization, the change in charge level can be calculated and the type of radiation determined based on known signatures associated with each type of radiation. As such, the binning process allows for more rapid evaluation of the type of radiation detected.

According to another embodiment, the process of determining an initial charge at a charge storage structure can include a setting process. Setting the state of the storage device (e.g., charge storage structures) such that it can be used to detect a certain type of radiation can include the use of the charge storage controller 24 of FIG. 4. The charge storage controller 24 can be used to set an amount of charge at each one of the charge storage structures 29 by providing or removing electrons into the charge storage structure. In more particular terms, the procedure can include modifying the charge at the charge storage structures 29 by adding or removing electrons to affect the voltage threshold of the charge storage structures 29. For example, after adding or removing electrons, the process of setting the state of the storage device can further include a read operation wherein the threshold voltage of a transistor associated with the charge storage structure 29 is assessed based on a read voltage from a signal module, such as the reference module 22. In the event that the threshold voltage does not fall within the defined voltage range of curve 205, the process of setting the state of the storage device can continue by changing the charge stored at the charge storage structure. Such a process can include further modifying the charge, that is, adding or removing electrons to change the charge stored at the charge storage structure 29. After which, another read operation can be repeated to further assess the threshold voltage of the transistor associated with the charge storage structure 29. Such modification of the charge stored at the charge storage structure can continue such that upon completion, the threshold voltage falls within the defined voltage range of curve 205 for each of the charge storage structures 29.

In certain instances, the defined voltage range of curve 205 includes a Gaussian distribution such that the defined voltage range of curve 205 includes a minimum voltage ($V_{MIN2}$), a maximum voltage ($V_{MAX}$), and an average voltage ($V_{AVG}$) between $V_{MIN2}$ and $V_{MAX}$. The average voltage can be an average, mean, or median value. The sensitivity of the radiation-detecting device is improved by knowing each charge storage structures 29 threshold voltage is within the defined voltage range of curve 205. Accordingly, the closer all the threshold voltage values of the charge storage structures 29 are to a common voltage, the more likely a radiation event that changes the threshold voltage of the charge storage structure is to be detected using a single read voltage. The defined voltage range of curve 205 can be defined by the voltage difference between $V_{MIN2}$ and $V_{MAX}$, and can have a value of not greater than about 0.6 V (600 mV). In certain other embodiments, the defined voltage range of curve 205 can be less, such as not greater than about 500 mV, not greater than about 300 mV, 250 mV, or even not greater than about 200 mV. According to a particular embodiment, the defined voltage range is between about 200 mV and about 700 mV.

After setting the initial charge level of each of the charge storage structures 209 within the defined voltage range of curve 205, the detection process can be carried out by determining if a first radiation event has occurred based on a charge storage structure 29 having a different charge level than the initial charge level. Such a process can include a read operation conducted at particular read voltage to determine if the initial charge level of any of the charge storage structures 29 has changed. In certain instances, the read operation can include one or more read operations, and according to a particular embodiment, can include at least a first read operation and a second read operation. The first read operation can be conducted at a first read voltage ($V_{R1}$). Notably, use of select read voltages for each of the read operations can aid determination of the type of radiation that is detected. That is, read voltages can be selected based upon known changes in the charge level associated with different types of radiation. For example, a particular read voltage or series of read voltages may be selected to determine if gamma radiation was detected, while a different read voltage or set of read voltages may be selected to determine if neutron radiation was detected. Additionally, more than one read operation at different read voltages may be conducted in instances where more than one type of radiation has been detected to determine the difference in the types of radiation.

In more detailed terms, the read voltages for each of the read operations can further determine the sensitivity of the radiation-detecting device based upon the proximity of the read voltage to the minimum voltage $V_{MIN2}$ of the defined voltage range 205. Based upon empirical studies, it has been shown that "background noise", which includes cosmic rays and other naturally occurring events, can cause shifts in the threshold voltages of the charge storage structures 29 of approximately 300 mV. Thus, in order to detect actual radiation events and avoid confusion between background noise and actual radiation events, the first read operation can be used to filter background noises. As such, embodiments herein use a voltage difference 207 between $V_{R1}$ and $V_{MIN2}$ of at least about 250 mV, and more particularly at least about 300 mV.

In addition to conducting a first read operation on the radiation-detecting device to determine if a radiation event has occurred, a second read operation can be completed after completing the first read operation. For example, a second read operation can be conducted immediately after the first read operation and before resetting the charge storage structures. Notably, a second read operation can be conducted at a second read voltage ($V_{R2}$) that is different than the first read voltage ($V_{R1}$). In certain embodiments, the voltage difference 215 between the $V_{R1}$ and $V_{R2}$ is at least about 100 mV, such as at least about 150 mV, at least about 200 mV, or even at least about 300 mV. In one particular embodiment, the voltage difference 215 between $V_{R1}$ and $V_{R2}$ is within a range between about 100 mV and about 1 V, and more particularly within a range between about 200 mV and about 600 mV.

In some instances, the read operation can be completed on a single charge storage structure 29 within the array. In other instances, the read operation can be performed on multiple charge storage structures simultaneously, such as on charge storage structures within the array at once such as on an entire row or column. Additionally, the one or more read operations can be initiated at different times by different controllers. For example, a read operation can be initiated by an operator of the device. Alternatively, a read operation can be timer controlled, such that it happens at predetermined intervals, such as a polling operation, which can be initiated by the timer module 25. Still, in other embodiments, the read operation can be initiated by a remote source, such as by a wireless signal or the like.

By conducting different read operations at different read voltages, the radiation-detecting device is capable of identifying different radiation signatures, and thus identifying different types of radiation. For example, given that neutron radiation has a radiation signature associated with a shift in the threshold voltage within a range between 400 mV to 2.2 V, the first read operation could be conducted at a minimum of 300 mV from $V_{MIN2}$ to filter the noise at read voltage $V_{R1}$. Accordingly, a second read operation could be conducted (at $V_{R2}$) at a voltage of approximately 400 mV (or more) from $V_{MIN2}$ to verify any charge storage structures 29 demonstrating a change in state were changed by a radiation event, that is, interactions with neutrons. Other types of radiation, such as gamma ray radiation, has a signature associated with a change in the threshold voltage within a range between 200 mV and about 500 mV, and as such the second read operation could be conducted (at $V_{R2}$) at a voltage of approximately 200 mV, and more particularly within a range between 200 mV and 500 mV (or more) from $V_{MIN2}$ to verify a gamma-ray based radiation event. Alternatively, for devices intended to detect x-ray radiation, the voltage difference 211 can be within a range between about 100 mV and about 300 mV. Accordingly, it will be appreciated that in order to determine the type of radiation detected, multiple read operations are conducted at different read voltages.

Upon determining that a radiation event has occurred through the use of one or more read operations, the process can further quantify the radiation event. For example, a quantification indicator can be based on the final value of the charge level associated with a charge storage structure that has a changed charge level. That is, if the initial charge level is 1 V and the charge level after a radiation event is 1.7 V, the quantification indicator can be indicative of the value of 1.7 V. In certain other embodiments, the quantification indicator can be based on a difference between the initial charge level and the final charge level. As such, based on the example above, the quantification indicator can be 0.7 V, that is the difference between the final charge level (1.7 V) and the initial charge level (1 V). The quantification indicator can be transmitted to a remote source, such as a data storage center. Additionally, the initial information can also be transmitted either prior to or at the same time as the transmission of the quantification indicator.

Upon identifying the final value of the charge level of the affected charge storage structure, the charge level can be categorized. Like the process of categorizing the threshold values in the bins (B1, B2, and B3) as discussed herein, the resulting final charge level can be categorized into one of a plurality of bins as well. In particular, the bins may be arranged such that a particular quantification indicator is associated with a particular bin, which in turn can be associated with identifying a particular type of radiation.

In addition to identifying the type of radiation detected, the present radiation-detecting structures can be operated such that the results of the detection are reported. The results of the detection can be reported to a local device for storage. Alternatively, the results can be reported to a remote source, such as a device off the chip, or even a completely separate device that is communicated with via a wireless signal or the like.

Reporting operations can make use of reporting criteria to determine whether to report the results of the detection. Whether certain types of radiation are reported can be based upon user's preference, application of the radiation-detecting structure, prevalence of naturally occurring radiation events or a combination thereof. As such, the reporting operation can make use of reporting criteria to which the type of radiation is compared to determine if the results of the detected radiation should be reported. For example, a reporting criteria can be based upon detecting a shift in the charge level of a charge storage structure of at least 1 V. Since such large shifts are generally associated with neutron events, the reporting criteria can be set to report only those events which appear to be neutron-based radiation events. As will be appreciated, the reporting operation can use multiple reporting criteria and each detected radiation event can be compared to each of the multitude of reporting criteria.

Moreover, different types of radiation can be reported using different reporting manners. Some such suitable reporting manners can include, audio alerts, written messages (e.g., text messages or emails), visual alerts, and the like. In particular instances, one type of radiation may result in one type of reporting manner, such as a simple message to a local device or user (or even a remote device or user) while detection of a second type of radiation may result in a different reporting manner, for example an audio or visual alert. This is based upon the fact that some types of radiation may be more important than others depending upon the reporting criteria.

The radiation-detecting structures described herein are radiation-detection structures having digital detection capabilities. In particular, the radiation-detecting structures can be charge storage structures that are read on a binary basis where one of two states of the device is detected with reference to a threshold value. In particular, the presently disclosed structures are dissimilar from crystal-based detecting structures and detecting structures relying on compounds such as CdZnTe (CZT), HgI, PbI, or AlSb which record events as an analog signal having an infinite number of result values that have to be translated to a digital signal.

It will be appreciated that the various devices and methods discussed above can be used in a variety of applications. For example, the applications can include imaging applications and monitoring applications. With respect to imaging applications, it would appreciated that the devices disclosed herein can be used to create images for to various scientific applications that need an image based upon the detection of radiation particles generated as a result of an analysis of particle collisions. It will be appreciated that the embodiments of devices described herein can be used in certain applications, such as monitoring applications. Examples of monitoring applications include applications suitable for monitoring radiation, such as security applications, for example applications to monitor the presence of nuclear materials. According to one embodiment, any one of the various embodiments herein can be incorporated within mobile devices, including for example personal mobile devices, and more particularly electronic or non-electronic personal mobile devices. For example, electronic personal mobile devices can include digital assistant devices, cell phones, computers, portable memory devices (e.g., flash memory) and any other hand-held or portable electronic personal device. Non-electronic personal mobile devices can include articles of clothing and accessories, badges, purses, wallets, and the like.

The embodiments herein describe a radiation-detecting device that is capable of detecting certain types of radiation based upon particular methods of operation, including a combination of operations such as setting the threshold voltage by modification of charge at charge storage structures, and multiple read operations. Notably, the use of certain operations and voltage ranges is based upon empirically derived information. While certain radiation-detecting devices that incorporate electronic components have been disclosed, none have the capabilities of those disclosed herein nor are such devices operated as disclosed herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A method of operating an electronic device comprising:
   determining an initial charge level at a non-volatile charge storage structure of a radiation-detecting device including a radiation-reactive material;
   determining a first radiation event has occurred based upon the non-volatile charge storage structure having a different charge level than the initial charge level; and
   identifying the first radiation event as associated with either a first type of radiation or a second type of radiation based upon the different charge level.

2. The method of claim 1, wherein determining the initial charge level includes setting the initial charge level at a non-volatile charge storage structure.

3. The method of claim 2, wherein setting the initial charge level include setting the initial charge level within a defined voltage range.

4. The method of claim 2, wherein setting an initial charge level comprises:
   modifying the charge level at a non-volatile storage structure; and
   reading the charge level associated with the non-volatile storage structure.

5. The method of claim 1, wherein determining the initial charge level comprises:
   reading a non-volatile storage structure to determine a charge level; and
   storing the charge level associated with the non-volatile storage structure.

6. The method of claim 5, wherein storing comprises storing the charge level at an integrated circuit that includes the non-volatile charge storage structure.

7. The method of claim 1, wherein the process of determining the initial charge level includes determining a first radiation event, and identifying is carried out at an integrated circuit.

8. The method of claim 1, further comprising reporting the first type of radiation and not reporting the second type of radiation.

9. The method of claim 8, wherein reporting comprises:
   determining if the first radiation event matches a reporting criteria, wherein the reporting criteria is different in response to the first radiation event being of a first type of radiation, than in response to the first radiation event being of a second type radiation.

10. The method of claim 1, wherein reporting comprises:
    reporting the first type of radiation using a first reporting manner; and
    reporting the second type of radiation using a second reporting manner different than the first reporting manner.

11. The method of claim 1, wherein a threshold voltage of a transistor device corresponds to the initial charge level.

12. The method of claim 1, further comprising determining a quantification indicator based upon the different charge level.

13. A method of operating an electronic device comprising:
    determining an initial charge level at a non-volatile charge storage structure of a radiation-detecting device including a radiation-reactive material;
    determining a first radiation event has occurred based upon the non-volatile charge storage structure having a different charge level than the initial charge level; and
    determining a quantification indicator based upon the different charge level, wherein the quantification indicator is associated with a type of radiation.

14. The method of claim 13, further comprising transmitting the quantification indicator and the initial charge level.

15. The method of claim 13, further comprising determining a duration between determining an initial charge level and determining a first radiation event.

16. The method of claim 13, wherein the quantification indicator is based on a difference between the initial charge level and the different charge level.

17. The method of claim 13, wherein determining a quantification indicator comprises conducting multiple read operations at multiple, different read voltages.

18. The method of claim 13, wherein the quantification indicator is associated with a radiation signature for identifying different types of radiation.

19. A method of operating an electronic device comprising:
    setting an initial charge level within a defined voltage range at a non-volatile charge storage structure of a radiation-detecting device including a radiation-reactive material;
    determining a first radiation event has occurred based upon the non-volatile charge storage structure having a different charge level than the initial charge level; and
    identifying the first radiation event as associated with either a first type of radiation or a second type of radiation based upon the different charge level.

* * * * *